May 25, 1965
M. SADOFSKY
3,185,923
MAGNETIC INSPECTION DEVICE HAVING VARIABLE INTENSITY
AUDIBLE ALARM MEANS RESPONSIVE TO SPACING
BETWEEN DEVICE AND TEST PIECE
Filed July 29, 1960
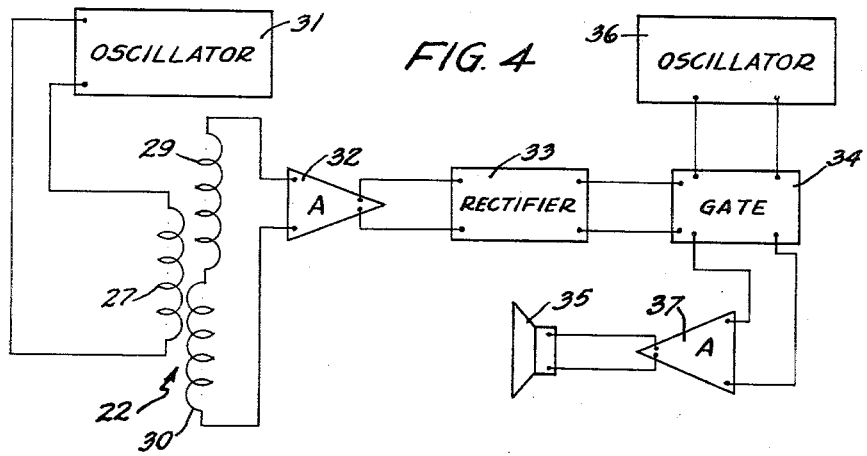
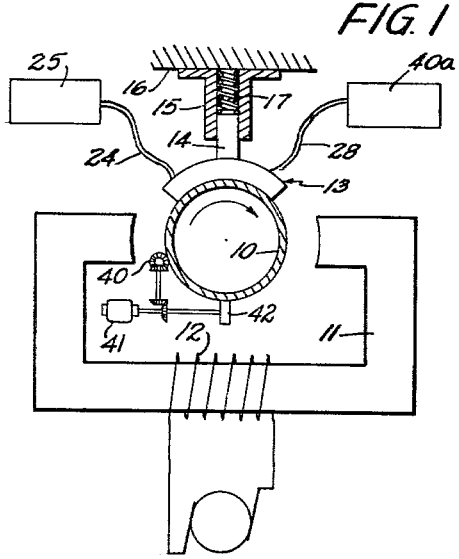
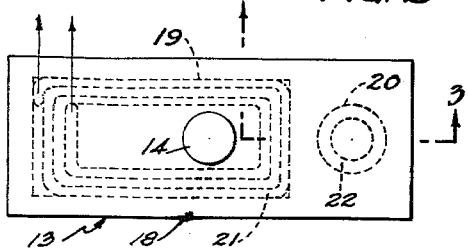
INVENTOR
*MICHAEL SADOFSKY*
BY Tom Arnold
D.C. Roylance
ATTORNEYS

United States Patent Office 3,185,923
Patented May 25, 1965

3,185,923
MAGNETIC INSPECTION DEVICE HAVING VARIABLE INTENSITY AUDIBLE ALARM MEANS RESPONSIVE TO SPACING BETWEEN DEVICE AND TEST PIECE
Michael Sadofsky, Houston, Tex., assignor, by mesne assignments, to American Machine & Foundry Company, New York, N.Y., a corporation of New Jersey
Filed July 29, 1960, Ser. No. 46,145
1 Claim. (Cl. 324—37)

This invention relates to apparatus for magnetic inspection of elongated members. While not limited thereto, the invention is particularly advantageous in connection with inspection of oil well tubular goods such as casing, drill pipe, tubing and the like.

It is now common practice to magnetically inspect elongated members by several procedures. Thus, ferromagnetic members, such as oil well tubular goods, are inspected by magnetizing the member and detecting distortions of the resulting magnetic flux which are caused by flaws, wear areas and like discontinuities. It is also common practice to inspect various kinds of electrically conductive members by magnetically inducing eddy currents therein, the eddy currents generating electromagnetic fields so that, if the configuration of the eddy currents is altered by the presence of a discontinuity in the member being inspected, such alteration can be readily detected. In all magnetic inspection procedures of the types referred to, a search coil or pickup device is employed to scan the member being inspected, it being necessary to maintain the search coil substantially constantly in close proximity to the surface of the member while accomplishing such relative movement between the search coil and the member being inspected that effective scanning of the member is accomplished.

All magnetic testing procedures of the general types referred to depend upon signals generated in the search coil or pickup device and these signals in turn depend not only upon the magnetic condition being detected but also upon the particular position of the search coil relative to the work. Thus, if the search coil is displaced from the work more than is intended, but not so greatly that no signals occur, the signals resulting during inspection will not be truly indicative of the discontinuities encountered in the work. Similarly, it will be apparent that the search coil can be displaced from the member being inspected to such an extent that detectable signals will not result even though discontinuities are encountered.

Particularly in the case of oil well tubular goods, the member being inspected may have considerable length. In fact, inspection may actually be carried out as the tubular goods are lowered into or raised from the oil well, as disclosed, for example, in U.S. Patents 2,882,488 and 2,909,393, issued to Berry Glenn Price et al. on April 14, 1959, and October 20, 1959, respectively. Where, as in such fields of application, the member being inspected is greatly elongated, the problem of maintaining the search coil substantially constantly in close proximity to the work is particularly difficult.

A general object of the invention is to provide, in magnetic inspection apparatus of the general type referred to, means responsive to the position of the pickup device relative to the member being inspected.

Another object is to provide, in such apparatus, means for automatically indicating whether or not the search coil is in close proximity to the work.

A further object is to devise, in an apparatus for magnetic inspection of oil well tubular goods, means for automatically giving an audible signal whenever the search coil is not in close proximity to the tubular goods being inspected.

Still another object is to provide an improved search shoe for use in magnetic inspection apparatus, which embodies proximity sensing means operative to respond to the position of the search shoe relative to the tubular goods being inspected.

In order that the manner in which these and other objects are attained, in accordance with the invention, can be understood in detail, reference is had to the accompanying drawings, which form a part of this specification, and wherein:

FIG. 1 is a diagrammatic illustration of an apparatus constructed in accordance with one embodiment of the invention for magnetically inspecting elongated tubular ferromagnetic members;

FIG. 2 is a plan view of a search shoe forming part of the apparatus of FIG. 1;

FIG. 3 is a fragmentary sectional view, on an enlarged scale for clarity, taken on line 3—3, FIG. 2, and FIG. 4 is a schematic diagram illustrating one electrical circuit useful in the apparatus of FIG. 1 for producing audible signals in accordance with the position of the search shoe relative to the member being inspected.

Referring now to the drawings in detail, and first to FIG. 1 thereof, it will be seen that the embodiment of the invention here illustrated is shown as applied to apparatus for magnetically inspecting an elongated ferromagnetic pipe 10, such as a piece of well casing, drill pipe, or the like. Pipe 10 is magnetized in any of the conventional fashions, as by means of an electromagnet 11 having pole pieces disposed to create a magnetic field extending transversely through the pipe 10, the electromagnet including an energizing coil 12 connected to any suitable source of power.

Scanning of the pipe 10 during inspection is accomplished by means of a search shoe 13 having an arcuate face engaged with the outer surface of the pipe. The search shoe 13 can be supported by any suitable mounting means, here illustrated diagrammatically as including a supporting rod 14 slidably engaged in a holder 15 attached to a fixed support 16, a compression spring 17 being provided to bias the search shoe resiliently toward and into engagement with the outer surface of the pipe 10. It will be understood that the search shoe supporting means just described is illustrated only diagrammatically and can take various specific forms. Thus, for example, the particular supporting structure shown in the aforementioned U.S. Patents 2,882,488 and 2,909,393 can be employed.

Referring now to FIGS. 2 and 3, it will be seen that the search shoe 13 comprises an integral body 18 of nonmagnetic material, such as brass, having a rectangular plan shape and an arcuate cross-section transversely of the axis of pipe 10. Body 18 is provided with two spaced cavities 19 and 20 opening toward the concave face of the body, the usual search coil 21 being disposed in cavity 19 and a proximity sensing device, indicated generally at 22, being disposed in the cavity 20. A thin, arcuate wear plate or shim 23 extends completely over the concave face of body 18, closing both cavities 19 and 20, plate 23 being secured to body 18 in any suitable fashion, as by means of non-magnetic screws (not shown). Search coil 21 can be of any conventional configuration and is fixedly mounted in cavity 19 in any of the usual manners, the search coil being provided with leads (not shown) connected to a mulitple conductor cable 24, FIG. 1, so that the signals generated in the search coil are supplied to an indicator or recorder 25 of any suitable conventional type capable of responding to and indicating or recording in meaningful fashion the signals generated by the search coil.

Stated broadly, the proximity sensing device 22 comprises at least one input coil inductively coupled to at least one output coil, the coils being arranged about an axis which, for best results, is substantially normal to the working face of the search shoe, the arrangement being such that, upon proper energization of the input coil or coils, the output condition of the proximity sensing device will be determined by proximity of the device to the metal member being inspected.

In this particular embodiment, the proximity sensing device 22 comprises a supporting bobbin 26 fashioned of non-magnetic material and so arranged that its longitudinal axis is at right angles to a plane extending tangentially of that point on the concave face of the search shoe body at which the proximity sensing device is located. On the center of bobbin 26 there is wound a single input coil 27 provided with leads, shown diagrammatically in FIG. 3, extending to the outside of body 18 and connected to conductors included in a mulitple conductor cable 28, FIG. 1. A pair of output coils 29 and 30 are also wound on the bobbin 26, output coil 29 being carried by the end portion of the bobbin above the input coil, viewing the device as in FIG. 3, and the coil 30 being carried by the end portion of the bobbin disposed below the input coil. Output coils 29 and 30 are so wound and electrically interconnected as to be in series opposition, the output coils having equal numbers of turns and being disposed equidistant from input coil 27. The output coils are connected to leads, indicated diagrammatically in FIG. 3, which extend to the outside of body 18 and are in turn connected to conductors embedded in cable 28. Thus, proximity sensing device 22 can be considfered an air core transformer in which coil 27 is the primary winding and coils 29 and 30 are balanced secondary coils.

Assuming that no conductive or magnetic member, such as the pipe 10, is present adjacent to proximity sensing device 22, and that input coil 27 is energized by alternating currents, it will then be understood that alternating current voltages are induced in the output coils, which voltages are equal and opposite so that they cancel each other and no output signal is produced. If, however, a conductive or magnetic member 10 is present, adjacent to the concave face of the search shoe, the ultimate magnetic effect of the input coil will be distorted in such fashion that the voltages induced in the two output coils are no longer of such nature as to completely cancel each other. Hence, presence of the conductive or magnetic member, such as the pipe 10, will cause a net output voltage to appear across the combination of the two output coils 29 and 30. The magnitude of this output voltage depends, among other things, upon the proximity of the conductive or magnetic member to the proximity sensing device. It will thus be apparent that, considering a conductive or magnetic member 10 of known material and general configuration and size, no signal at all will be supplied by device 22 when that member is absent and a signal will be supplied when the member 10 is brought into proximity with device 22, which signal will vary in strength in accordance with the nearness of the member 10 to the proximity sensing device.

Via the conductors of cable 28, the leads of the input and output coils of the proximity sensing device 22 are connected to an electric circuit indicated generally by numeral 40a in FIG. 1 and shown in detail in FIG. 4. Thus, the input coil 27 is conected to the output of an oscillator 31, the oscillator 31 having such output frequency characteristics that currents induced in the pipe 10 as a result of energization of input coil 27 exist only in the outer skin of the pipe. For example, oscillator 31 can have a 3-kilocycle output. Output coils coils 29 and 30 are connected in series opposition to the input terminals of a conventional alternating current voltage amplifier 32, the output of amplifier 32 being connected to the input of a conventional rectifier 33 serving to supply direct current signals to control a conventional gate circuit 34. Gate circuit 34 can be of the type shown in the text, Pulse and Digital Circuits, by Millman and Taub, McGraw-Hill (1956), at FIG. 14–2, pages 430–431.

In this embodiment, the output condition of the proximity sensing device 22 is employed to control energization of an audible signal device, such as a conventional loud speaker 35. In order that the loud speaker can be properly energized, an audio frequency oscillator 36 is employed, the output of oscillator 36 being supplied to energize the loud speaker only via gate circuit 34 and amplifier 37. Gate circuit 34 is so constructed and connected as to prevent the output of oscillator 36 from being effectively applied to the loud speaker so long as the direct current control voltage from rectifier 33 exceeds a predetermined value which corresponds to an acceptable close proximity of the pipe 10 to the proximity sensing device 22. Further, the gate circuit 34 functions to "open" progressively, allowing an increasing energization of the loud speaker by the oscillator output, as the value of the DC output voltage of rectifier 33 decreases progressively below the predetermined value. Hence, so long as the pipe 10 is in contact with wear plate 23, or is at least in satisfactorily close proximity to the proximity sensing device 22, the loud speaker 35 is not energized because no adequate control voltage is applied by rectifier 33 to the gate circuit 34. However, if the proximity sensing device 22 is moved away from pipe 10 beyond the critical spacing, the loud speaker will then be energized to provide an audible signal which increases in volume in proportion to the increase in space between the proximity sensing device and the pipe.

Bobbin 26 is clamped rigidly between an annular shoulder portion 38 of body 18 in the bottom of cavity 20 and the inner face of wear plate 23. Lateral shifting of the bobbin is prevented by the shoulder portion 38 and a relatively rigid non-magnetic annular member 39 disposed in contact with the wall of cavity 20 at the mouth thereof and embracing the adjacent end of bobbin 26. Thus, it will be apparent that the proximity sensing device 22 is held in fixed position in rigid search shoe body 18. As has already been mentioned, the search coil 21 is fixed in its cavity 19 in body 18, so as to be immovable relative to the search shoe body. Consequently, the proximity sensing device and the search coil are mounted in the search shoe body in fixed positions relative to each other. Accordingly, the relative proximity of the proximity sensing device 22 to pipe 10, and therefore the output signal from device 22, can be taken as indicative of the position of search coil 21 relative to pipe 10. Therefore, energization, and lack of energization, of the loud speaker 35 indicate the proximity of the search coil to the pipe 10 being inspected.

It will be apparent from the discussion of the circuit in FIG. 4 that the gate circuit 34 functions as an electrical relay to control the loud speaker energizing circuit in accordance with the condition control circuit connected to the output of the proximity sensing device 22. In this embodiment, the loud speaker 35 is employed as the electrical device ultimately controlled in accordance with the condition of the proximity sensing device. Use of a loud speaker, so that an audible signal is provided, is of particular advantage when the invention is to be used in inspecting such things as oil well tubular goods. This is because inspection of such goods is frequently carried out under conditions, such as those existing at the well during raising or lowering of pipe, which make a loud, audible signal desirable. It will be understood, however, that the output of the proximity sensing device 22 can be employed to actuate devices other than an audible signal device and can, in effect, operate through electrical relay means other than the gate circuit 34. For example, the combination of output coils 29 and 30, amplifier 32 and rectifier 33 can be connected to control the energization of a relay, of electromagnetic or other type, for the purpose of stopping operation of the magnetic inspection apparatus whenever the search shoe is not properly positioned adjacent to the pipe 10.

In this latter connection, it is to be understood that the pipe 10 can be fed axially past the electromagnet 11 and search shoe 13, the pipe also being rotated, so that the search shoe scans the surface of the pipe in helical fashion. Such axial feeding and rotation of the pipe can be accomplished, for example, by means of conventional feed rollers 40 driven by an electrical motor 41, which may, in turn, be connected to drive wheel 42, as shown, for example in U.S. Patents 2685,672, issued August 3, 1954, and 2,878,446 issued March 17, 1959, to B. G. Price et al. Hence, the control signal derived from output coils 29 and 30 can be used to control a relay to de-activate the drive motor for such feed rolls.

Although only one embodiment has been illustrated, it will be apparent that many changes can be made in the details and arrangements of parts without departing from the scope of the invention as defined in the appended claim.

What is claimed is:

In an apparatus for magnetically inspecting a tubular ferromagnetic member for defects, the combination comprising:

an arcuate search shoe shaped for engaging the outside surface of said tubular member and having
- a search coil fixedly mounted therein for producing electrical defect signals as an incident of defects detected in said tubular member, and
- an air-core differential transformer having at least one input coil inductively coupled to at least one output coil, said input and output coils being fixedly mounted in said shoe,
- said at least one output coil being operative to produce variations in electrical output when said shoe is moved radially with respect to the outside magnetizable surface of said tubular member, the size of said variations being proportional to the size of said radial movement,
- said search coil being operative to provide significant electrical defect signals only when said movement of said shoe is limited to maintain said shoe within a predetermined distance from said outside surface of said tubular member;

means for providing relative non-radial motion between said shoe and said wall of said tubular member during engagement between said shoe and said outside surface of said tubular member;

indicator means responsive to said defect signals produced during said relative non-radial movement for indicating defects in said tubular member;

a loudspeaker;

an electrical circuit interconnecting said at least one output coil and said loudspeaker,
- said circuit being responsive to said variation in electrical output from said at least one output coil to transmit energizing signals to said loudspeaker when said variations are above a predetermined level,
- said energizing signals being directly proportional to the radial spacing between said shoe and said outside magnetizable surface of said tubular member;

whereby said loudspeaker is increasingly energized in proportion to said radial spacing and only when said spacing exceeds said predetermined distance.

References Cited by the Examiner

UNITED STATES PATENTS

| | | | |
|---|---|---|---|
| 2,011,425 | 8/35 | Sperry et al. | 324—37 |
| 2,629,004 | 2/53 | Greenough | 324—34 |
| 2,766,425 | 10/56 | McKee et al. | 324—37 |
| 2,805,677 | 9/57 | Baird | 324—34 |
| 2,927,455 | 3/60 | Outterson | 324—34 |
| 2,975,397 | 3/61 | Edgerton | 340—258 |
| 3,024,354 | 3/62 | Mierendorf et al. | 219/131 |

WALTER L. CARLSON, *Primary Examiner.*

LLOYD McCOLLUM, FREDERICK M. STRADER,
*Examiners.*